UNITED STATES PATENT OFFICE.

JOSEPH KOETSCHET, OF ST. FONS, FRANCE, ASSIGNOR TO LA SOCIÉTÉ CHIMIQUE DES USINES DU RHÔNE ANCIENNEMENT GILLIARD P. MONNET ET CARTIER, OF LYONS, FRANCE.

PROCESS OF MAKING ALDEHYDO-BENZOIC ACID.

SPECIFICATION forming part of Letters Patent No. 607,056, dated July 12, 1898.

Application filed December 14, 1897. Serial No. 661,868. (Specimens.)

*To all whom it may concern:*

Be it known that I, JOSEPH KOETSCHET, of St. Fons, France, have invented certain new and useful Improvements in the Manufacture of Aldehydo-Benzoic Acid and Intermediate Products, of which the following is a specification.

This invention relates to the manufacture of aldehydo-benzoic acid, which is the simple aldehyde of ortho-phthalic acid.

The invention includes certain intermediate products obtained in the manufacture of aldehydo-benzoic acid in the manner hereinafter described.

When ortho-oxalyl-benzoic acid, $$C_6H_4\diagup^{COCOOH}_{\diagdown COOH},$$

which may be obtained by the oxidation of naphthalene or of naphthalene derivatives with permanganate, is boiled with anilin, an insoluble body is formed, melting above 250° centigrade, which is not a benzylidene derivative, nor can it be converted into aldehydo-benzoic acid by any known method. I have discovered that if ortho-oxalyl-benzoic acid is, however, treated with anilin in aqueous solution a novel product is formed of the probable formula,

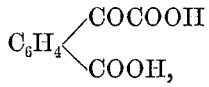

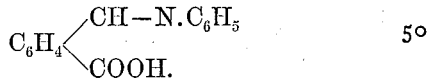

which is very sensitive to reagents and may be converted into aldehydo-benzoic acid. The product of the said reaction is only slightly soluble in water, melts at 165° centigrade with evolution of gas, and, if melted, becomes converted into the above-mentioned insoluble body, melting above 250° centigrade.

Both the new anilin-salt obtained by treating ortho-oxalyl-benzoic acid with anilin in aqueous solution and the free acid liberated from it may be converted in various ways into anilido-benzylidene-orthocarboxylic acid $$C_6H_4\diagup^{CH-N.C_6H_5}_{\diagdown COOH}.$$

A certain quantity of this compound is formed by melting the anilin salt in vacuum, when anilin distils off, leaving a residue, which contains, besides the benzylidene-carboxylic acid, also considerable quantities of the above-mentioned insoluble body, melting above 250° centigrade.

A very good yield of the benzylidene-carboxylic acid is obtained if the anilin salt, formed by the treatment of ortho-oxalyl-benzoic acid with anilin in aqueous solution or its free acid, is boiled with a neutral solvent, such as toluene or xylene. The product thus obtained melts at 174° centigrade and is identical with the anilido-benzylidene-orthocarboxylic acid described by Racine. By simply boiling with mineral acids it is converted into aldehydo-benzoic acid.

According to one way of carrying out the invention there may be used as raw material the solution obtained by oxidation of naphthalene or naphthalene derivatives with permanganate after filtering off the manganese oxid and acidulating with acetic acid. The solution always contains phthalic acid as well as ortho-oxalyl-benzoic acid; but the phthalic acid can be easily removed as anilin salt in the course of the following operation:

To the solution of ortho-oxalyl-benzoic acid are added three molecular proportions of anilin with constant stirring, and the mixture is warmed for half an hour at 80° to 100° centigrade. On cooling, the new anilin salt crystallizes out in yellowish leaflets of great purity, while any phthalic acid remains in solution as anilin salt. The new product is filtered off and dried. The anilin salt thus obtained is suspended in five times the quantity of commercial xylene, for instance, and heated to boiling for about an hour under a returncondenser. Gradually all goes into solution with evolution of carbon dioxid and after cooling the anilido-benzylidene-orthocarboxylic acid crystallizes out. It is filtered off, and when thus obtained melts at 174° centigrade without decomposition.

In order to convert it into aldehydo-benzoic acid, the anilido-benzylidene-orthocarboxylic acid is suspended in about ten times the quantity at ten per cent. hydrochloric or sulfuric acid and warmed upon the water-bath. Solution rapidly takes place, and after filtration the cold solution is extracted with ether. From the ethereal extract aldehydo-benzoic acid may be obtained in the usual way by vaporizing the ether at a low temperature, as will be well understood, in a very pure state, melting at 97° to 98° centigrade.

What I claim, and desire to secure by Letters Patent, is—

1. The method substantially as hereinbefore described of producing the anilin salt of the herein-described new acid, which method consists in treating ortho-oxalyl-benzoic acid with anilin in aqueous solution as set forth.

2. The method substantially as hereinbefore described of separating ortho-oxalyl-benzoic acid from phthalic acid, which method consists in treating with anilin the solution obtained by oxidation of naphthalene or naphthalene derivatives with permanganate as set forth.

3. As a new product, the anilin salt of the herein-described new acid having the characteristic properties of being very sensitive to reagents, slightly soluble in water, of having a melting-point of 165° centigrade with evolution of gas; and if melted becoming converted into an insoluble body with a melting-point above 250° centigrade.

4. The method substantially as hereinbefore described of producing anilido-benzylidene-ortho-carboxylic acid, which method consists in treating ortho-oxalyl-benzoic acid with anilin in aqueous solution, whereby an anilin salt is obtained, and in then heating said anilin salt in a neutral medium as set forth.

5. The method substantially as hereinbefore described of producing aldehydo-benzoic acid which method consists in treating ortho-oxalyl-benzoic acid with anilin in aqueous solution, whereby an anilin salt is obtained, in then heating said anilin salt in a neutral medium whereby anilido-benzylidene-orthocarboxylic acid is obtained, and in then converting said anilido-benzylidene-orthocarboxylic acid into aldehydo-benzoic acid by extracting with ether and vaporizing the ether, as set forth.

In witness whereof I have hereunto signed my name in the presence of two subscribing witnesses.

JOSEPH KOETSCHET.

Witnesses:
 RODOLPHE PFISTER,
 EMIL MARQUETANT.